(12) United States Patent
Musial et al.

(10) Patent No.: US 8,719,840 B2
(45) Date of Patent: *May 6, 2014

(54) DEVICE FOR SECURE INTERPROCESS COMMUNICATION

(75) Inventors: Pawel Musial, Geldrop (NL); Peter Jan Slikkerveer, Waalre (NL)

(73) Assignee: Koninklijke Philips N.V., Eindhoven (NL)

( * ) Notice: Subject to any disclaimer, the term of this patent is extended or adjusted under 35 U.S.C. 154(b) by 1369 days.

This patent is subject to a terminal disclaimer.

(21) Appl. No.: 11/816,281

(22) PCT Filed: Feb. 9, 2006

(86) PCT No.: PCT/IB2006/050427
§ 371 (c)(1),
(2), (4) Date: Aug. 15, 2007

(87) PCT Pub. No.: WO2006/087657
PCT Pub. Date: Aug. 24, 2006

(65) Prior Publication Data
US 2008/0163247 A1    Jul. 3, 2008

(30) Foreign Application Priority Data

Feb. 17, 2005 (EP) .................................... 05101208
Apr. 28, 2005 (EP) .................................... 05103528

(51) Int. Cl.
*G06F 9/54* (2006.01)

(52) U.S. Cl.
USPC ........................................ 719/313; 235/492

(58) Field of Classification Search
CPC ............................ G06F 21/77; G06Q 20/3567
USPC ........................................... 719/313; 235/492
See application file for complete search history.

(56) References Cited

U.S. PATENT DOCUMENTS 6,005,942 A * 12/1999 Chan et al. ..................... 713/187
6,256,690 B1    7/2001 Carper
(Continued)

FOREIGN PATENT DOCUMENTS

DE          19631557 A1    2/1998
EP           0949595 A2   10/1999
JP          2001331771    11/2001

OTHER PUBLICATIONS

Meckler, A., "Java and Inter-Applet Communication: A Communication Mechanism Using the Java Has Table", Dr. Dobb's Journal, M&T Publ., Redwood City, CA, vol. 22, No. 10 (Oct. 1997), pp. 46, 48, 50-53, and 103.*

(Continued)

*Primary Examiner* — H S Sough
*Assistant Examiner* — Brian W Wathen

(57) ABSTRACT

A device (200; 300) comprising a first application unit (401) and a second application unit (402) provided in a first portion (202) of the device (200; 300), and a transfer unit (211) provided in a second portion (212; 302) of the device (200; 300), wherein the transfer unit (211) is adapted to transmit a message between the first application unit (401) and the second application unit (402), and wherein a higher level of security is provided in the first portion (202) than in the second portion (212; 302) and/or wherein the transfer unit (211) is adapted to take the role of a communication master when transmitting the message between the first application unit (401) and the second application unit (402).

13 Claims, 2 Drawing Sheets

(56) References Cited

U.S. PATENT DOCUMENTS

| | | | |
|---|---|---|---|
| 6,807,561 | B2 * | 10/2004 | Lagosanto et al. ............ 709/203 |
| 6,810,521 | B1 * | 10/2004 | Gelgon et al. ................ 719/313 |
| 2002/0082847 | A1 | 6/2002 | Vandewalle et al. |
| 2002/0195493 | A1 | 12/2002 | Dell |
| 2004/0056083 | A1 * | 3/2004 | Graf et al. .................... 235/379 |
| 2004/0124246 | A1 * | 7/2004 | Allen et al. ................... 235/492 |
| 2004/0139021 | A1 * | 7/2004 | Reed et al. ...................... 705/50 |
| 2004/0250066 | A1 * | 12/2004 | Di Luoffo et al. ............ 713/168 |
| 2004/0263319 | A1 * | 12/2004 | Huomo ....................... 340/10.2 |
| 2004/0263431 | A1 | 12/2004 | Hohmann et al. |
| 2005/0102679 | A1 * | 5/2005 | Susser et al. .................. 719/315 |

OTHER PUBLICATIONS

Rankl, W.; Effing, W., "Smart Card Handbook," 3$^{rd}$ edition (1993), pp. 1-1088.*

* cited by examiner

DEVICE FOR SECURE INTERPROCESS COMMUNICATION

FIELD OF THE INVENTION

The invention relates to a device as well as to a method of operating a device.

BACKGROUND OF THE INVENTION

A smartcard or chipcard can be a tiny secure cryptoprocessor embedded within a credit card sized card or within an even smaller card, like a GSM card. A smartcard does usually not contain a battery, but power is supplied by a card reader/writer, that is to say, by a read and/or write device for controlling the functionality of the smartcard by reading data from the smartcard or by writing data in the smartcard.

A smartcard device is commonly used in the areas of finance, security access and transportation. Smartcards usually contain high security processors that function as a secure storage means of data like cardholder data (for instance name, account numbers, number of collected loyalty points). Access to these data is only possible when the card is inserted to a read/write terminal.

It is a challenging task to enable integration of a user interface functionality directly in smartcards. For instance, a display may be integrated within a smartcard to display information to a user. Or, buttons may be included in the smart card to allow a user to enter data.

Smartcards were consciously designed without a man-machine interface providing user interaction capability. The lack of support for user interaction reflects both in the hardware design and in the software design (operating system) of known smartcards.

This conscious choice has been driven by the lack of technology for thin, flexible displays and due to strong security requirements posed for smartcards. Nowadays, since the technology for thin, flexible displays is present, strict security rules and procedures make the implementation of user interaction difficult. The introduction of API (application programming interface) known from consumer electronics devices and from personal computer devices is difficult, since security rules require that every system component has to be developed under governance of special procedures, for instance with respect to security and reliability. This requires, when developing or changing any chipcard processor component or software component, a long lasting certification procedure followed by a long lasting process of industry acceptance.

In the following, referring to FIG. 1, a smartcard 100 with integrated display functionality according to the prior art will be described.

The smartcard 100 comprises a plastics substrate 101 on which an integrated circuit is formed which provides the smartcard functionality.

In a security domain or processor 102 (a secure IC processor) of the smartcard, in which a high level of security is provided, a card manager unit 103 (which may be a logical unit, a software procedure running when an Application Protocol Data Unit, APDU, is received) is arranged which is adapted to communicate with a plurality of application units 104 each of which contains data and commands needed for servicing different applications. An operating system 105 is provided containing software for operating the smartcard 100. Further, a plurality of driver units 106 are provided, each for driving an associated hardware unit 107.

The smartcard 100 is designed to communicate with a smartcard read and write terminal 108 as a master. The communication between the terminal 108 and the smartcard 100 is performed via the exchange of Application Protocol Data Units (APDU) according to ISO 7816. The card manager unit 103 exchanges APDUs with a particular one of the application units 104 to carry out a corresponding one of the applications.

The internal structure of the smartcard 100 is similar to a standard (personal computer like) architecture which can be described in the well-known layered model. Looking at the hardware units 107, these units may include processors, memories, peripherals and several encryption/decryption co-processors working directly with low-level drivers. The driver units 106 are forming a part of the Operating System Layer (OSL). OSL provides an abstraction of functions in hardware to applications and provides additional functions often reused by applications. The operating system 105 is also responsible for chip initialization during power-up.

On the top of the operation system, provider specific applications may be run which are shown schematically in FIG. 1 as application units 104. Since smartcards like the smartcard 100 are commonly used with terminals like the smartcard read and write terminal 108, a master-slave like communication behaviour is deployed. This means that the terminal 108 is initiating communication with the smartcard 100 sending Application Protocol Data Units (APDU) to the processor 102. The card manager 103 using address field in APDU may recognize to which application unit 104 it should be forwarded. Addressed application, after reception of that information, executes requested action and in return responds with status/data to the terminal 108. This communication scheme requires that for complex applications, both terminal 108 and smartcard 100 have to store actual state of communication.

Apart from the described components and their function, the smartcard 100 comprises extensions to allow a user interface functionality of the smartcard 100.

For this purpose, in a portion of the smartcard 100 which does not relate to the security domain 102, buttons 112 and a display hardware 113 are provided. In order to allow a user to interact with the smartcard 100 via inputting commands by the buttons 112, there is a connection between the buttons 112 and a display interface unit 111 arranged on the level of the hardware units 107 and in the secure domain 102. Further, a display driver unit 110 is provided on the level of the driver units 106 to allow a user to visually perceive data being displayed on the display hardware 113. In the smartcard 100 shown in FIG. 1, a display functionality or user interface functionality is provided by the displays 113 and the buttons 112. Furthermore, an extension or adaptation of the operating system 105 is necessary, which is shown schematically as an operating system extension 109 in FIG. 1.

The smartcard 100 includes, next to standard blocks shown in solid lines, additional blocks 110, 111, 112, 113 marked with dotted lines. These additional blocks provide the user interface functionality. It can be seen that a new hardware component 111 with a corresponding display driver 110 has been added and the operating system 105 has been extended with functions to provide display functionality API to the applications performed according to the application units 104.

However, the smartcard 100 implementation according to FIG. 1 has some drawbacks.

Firstly, the operating system 105 requires modification in the form of the operating system extension 109. This causes development costs and certification costs. Moreover, due to the modifications interfering in the secure domain 101 of the smartcard 100, potential security risks occur.

Secondly, apart from additions of the hardware drivers, an additional mode of use for the smartcard 100 has to be defined which differs from the native master-slave mode. This additional mode can be used when the smartcard 100 is started out-of-terminal (so-called "standalone mode") to respond to a user pressing the buttons 112 and to display information. This affects the architecture of the smartcard 100 system and brings additional security threat which requires additional qualification.

Thirdly, the application units 104 need to be modified to incorporate display functionality. This is difficult to achieve for well-known established and accepted standards like EMV ("Europay, Mastercard, VISA", a standard for credit/debit financial card applications) or CEPS ("Common Electronic Purse Specification", a standard for e-Purse Applications) and would require re-standardization.

Fourthly, the smartcard device (chip) requires to have additionally a hardware interface, namely the display interface 111, to communicate to the display 113 and to the display driver 110, respectively. Such an interface may not be desired due to security threats. U.S. Pat. No. 6,256,690 discloses a smart card comprising a microprocessor and a memory, wherein the memory stores first and second applications. The memory further comprises a memory portion designated as a message box adapted to receive a message data object from at least the first application and adapted to communicate the data message object to at least the second application. However, the architecture and communication scheme according to U.S. Pat. No. 6,256,690 has the disadvantage that security problems may occur when operating the IC card.

OBJECT AND SUMMARY OF THE INVENTION

It is an object of the invention to enable efficient communication between components of a device.

In order to achieve the object defined above, a device and a method of operating a device according to the independent claims are provided.

According to an exemplary embodiment of the invention, a device is provided comprising a first application unit and a second application unit both provided in a first portion of the device, and a transfer unit provided in a second portion of the device, wherein a higher level of security is provided in the first portion than in the second portion. The transfer unit may be adapted to transmit a message between the first application unit and the second application unit.

Furthermore, according to another exemplary embodiment of the invention, a method of operating a device comprising a first application unit and a second application unit in a first portion of the device and a transfer unit in a second portion of the device is provided, wherein a higher level of security is provided in the first portion than in the second portion. The method may comprise the step of transmitting a message between the first application unit and the second application unit via the transfer unit.

According to still another embodiment of the invention, a device is provided comprising a first application unit and a second application unit provided in a first portion of the device, and a transfer unit provided in a second portion of the device. The transfer unit may be adapted to transmit a message between the first application unit and the second application unit and the transfer unit may be adapted to take the role of a communication master when transmitting the message between the first application unit and the second application unit.

According to yet another embodiment of the invention, a method of operating a device is provided, wherein the device comprises a first application unit and a second application unit in a first portion of the device and a transfer unit in a second portion of the device. The method may comprise the step of transmitting a message between the first application unit and the second application unit via the transfer unit, wherein the transfer unit may be adapted to take the role of a communication master when transmitting the message between the first application unit and the second application unit.

The efficient communication architecture according to an exemplary embodiment of the invention can be realized by a computer program, i.e. by software, or by using one or more special electronic optimization circuits, i.e. in hardware, or in hybrid form, i.e. by means of software components and hardware components.

The term "application unit" may particularly denote any software and/or hardware component of a device, which has the capability of providing an assigned function or service in the frame of the operation of the entire device. Such an application may be, in an example that the device is a credit card, the provision of particular data like the value of a credit balance. Another application may be, in the example that the device is a credit card, the provision of data in a particular format, for instance ready to be displayed on a display device. Such an application may be dependent on or independent of other applications running on or provided on the device.

The term "transfer unit" may particularly denote any software and/or hardware component of a device, which has the capability of transferring data received from a data source towards a data destination. This transfer may include or exclude any processing of the data by the transfer unit. For instance, the transfer unit may merely convey the data without modifying the latter. Alternatively, the transfer unit may analyze, interpret or modify (for instance change the format of) the data before sending the latter to the destination.

The term "higher level of security" may particularly have the meaning that any measures related to the secure handling of data may be taken in the first portion of the device which are not taken in the second portion of the device. In other words, the first portion may have at least one security feature which is lacking in the second portion. Also the second portion may be a relatively secure area which may, however, be less secure than the first portion in an absolute measure. Alternatively, no security measures at all may be taken in the second portion. "Security" may particularly denote security of data access and data transfer, and may include restrictions concerning the authorization to access or otherwise handle the data or access a particular part of the device. This may include features like data encryption and/or passwords required for data access.

The term "communication master" may particularly have the meaning that the corresponding communication entity or instance initiates and/or controls the communication with one or more other communication entities or instances then acting as slaves. In computer networking, master/slave may be a model for a communication protocol in which one entity or process (known as the master) controls one or more other entities or processes (known as slaves). Once the master/slave relationship is established, the direction of control may be always from the master to the slave(s).

The term "context master" may particularly have the meaning that the corresponding entity is responsible for the content of a message or generates a message respectively.

The characterizing features according to the invention may particularly have the common advantage that an efficient communication architecture may be realized. According to a first aspect, this may be achieved by providing application units in a secure region and a transfer unit or data mirror in a less secure region, so that a communication between the application units may be enabled via the transfer unit without the necessity to modify and certify the (already existing) application units. According to a second aspect, this may be achieved by providing application units as slaves and a transfer unit or data mirror as a master concerned in a communication scheme in which the master may control and initiate a communication. This may have the similar effect that at least one of the two application units receiving content of a communication message does not have to recognize or analyse the origin of the message and may thus be implemented as an existing module without the necessity to adapt this (already existing) application unit to a new purpose of use.

According to the first aspect, a secure transfer of a message to be transmitted between two application units (both located in a secure area) is mediated by a transfer unit (located in a less secure or non-secured area). In other words, a data mirror is provided in the form of the transfer unit which may allow a "reflection" of data to be transmitted between two application units positioned in a secure portion of a device. The transfer unit may not have to decrypt or modify data sent between the two application units. This may allow to make possible a communication between two application units provided in a security portion of a device without the need to modify the application units. It would be very time consuming and difficult to modify application units provided in a secure portion, whereas it may be much easier to provide a transfer unit apart from the security region for conveying or transmitting data between the application units.

An exemplary application of the device according to the invention is a smartcard in which the two application units are capable of providing two different applications and are provided in a secure processor of the smartcard. The transfer unit may be provided outside the secure processor and may allow communication between the application units.

For instance, one of the application units may provide the functionality to format data to be visually displayable, and the other application unit may provide the functionality to provide a particular data content in a smartcard. In a scenario in which this data content has to be displayed on a display device of the smartcard, the data content can be formulated as a message which is transmitted from the corresponding application unit via the data mirror or transfer unit to the other application unit which is capable of reformatting the data to be displayable. By taking this measure, it may be possible to provide a display functionality in a smartcard without modifying a (certified) application unit capable of providing the data content but incapable of providing displayable data.

According to one aspect of the invention, a communication between different secure software modules (for instance a credit card, electronic purse) is enabled which software modules may be carried out by a processor of a smartcard, which processor may be secured against external manipulation. This communication may be enabled according to an embodiment of the invention without the necessity to modify or accordingly adapt the software modules. A modification of software modules provided in a secured portion of a smartcard would require a security certification of the modified smartcard which would require a high expense of money and a loss of time.

For this purpose, a data mirror may be provided outside the secure portion, which data mirror is capable of conveying messages from one application to another one. In this context, the same (or another) communication protocol may be used as for the communication between the smartcard and a remote terminal (like a cash machine or a smartcard read/write device). Thus, for a communication between the applications, the same communication protocol may be used as for the communication with a terminal (cash machine or smartcard reader). This may hold at least for a portion of the communication path.

According to an exemplary embodiment, it may be "invisible" or undetectable for an application unit to recognize whether it communicates with a remote terminal or (via the transfer unit) with another application unit.

Thus, the application units may be located in a secure portion and the transfer unit may be located in a less secure portion of the device, in which less secure portion a lower degree of security is provided, or no security at all, Thus, the requirements for accessing the less secure portion may be less strict than the requirements for accessing the more secure portion of the device.

Taking these measures may have the advantage that all security features which are effective between terminal and smartcard may also be effective for the communication between the application units without the necessity that all the application units have to be rewritten. A certification examination may thus be dispensable. Further, an operating system for such a device, for instance a smartcard, may remain unchanged. Only the sending or source application has to become active.

The first communication unit may send a message to one or a plurality of second application units, sequentially or simultaneously. This may allow a very efficient data exchange.

According to one aspect of the invention, a method of communication between a first and at least a second application is provided, both situated in a first domain of a device, via a transfer module which is situated in a second domain of that device. The second domain may be less secure against tampering than the first domain. The method may comprise the steps of transmitting a message from the first application to the transfer module, according to a communication protocol which is used for communication between the device and a remote terminal, and transmitting the message from the transfer module to the second application, according to the communication protocol.

The device according to the invention may be realized as a contact type device or as a contactless device.

According to an exemplary embodiment of the invention, a device is provided that does not require any modification in an operating system of the device (for instance a smartcard) for a communication between different application units. Only one of the two applications needs to be prepared to work with a mirror function. The other application may remain completely unchanged.

According to the mirror function, one application may send an Application Protocol Data Unit (APDU) to the other application just like a terminal would do. In other words, the first application can play a role of a terminal taking the initiative and being a master in data exchange process. The second application may be in principle not aware that it communicates with the first application and not with a real terminal.

For instance, a communication between (existing and/or novel) parts in a secure area may take place via the transfer unit as a third party which may be part of the smartcard but situated outside the secure area. Hence, existing parts (for instance a high secure legacy application) can remain unchanged, since the communication protocol used for the intra-device communication may be the same as used for the communication of the device with a terminal.

A legacy application may be provided in a secure area as well as a display application. In contrast to this, a smart display controller as a third party may be provided outside the secure area and may convey messages exchanged between the legacy application and the display application.

For instance, the display application may send data as well as a request to forward data to the legacy application to a smart display controller. Then, the smart display controller may forward the data as requested. After that, the legacy application may respond in a usual way (like communicating with a terminal). The smart display controller may forward the response to the display application. Furthermore, the display application may request the smart display controller to display the received data.

This may allow a quick integration of the display functionality into existing smartcard systems without affecting the total system security. Furthermore, backward compatibility to existing systems may be provided.

According to the second aspect, the transfer unit may be adapted to take the role of a communication master when transmitting a message between the first application unit and the second application unit. In other words, the transfer unit may be the initiator of a communication between the two application units. Particularly the transfer unit may send a query to the first application unit asking whether a communication is to be established. In case a message is to be sent to the second application unit, the first application unit supplies the transfer unit with the message. Then, the transfer unit may send the message (in the original format or reformatted) to the second application unit. In other words, the transfer unit may take the role of a master concerning the initiation of receiving and/or sending the message from or to a particular one of the application units, whereas the application units act as slaves on this hierarchic level. In contrast to this, concerning the content of the message to be broadcast, the sending application unit may act as a kind of master, and the receiving application unit may act as a slave.

By adapting the transfer unit as a communication master and the application units as slaves of the implemented communication architecture, at least the application unit receiving the message does not have to be aware which unit has initiated the communication, but simply has to provide the requested service. This may have the consequence that an already existing hardware and/or software module may be used for the (second) application unit. It may be dispensable to adapt such a module to a specific communication path, since this application unit simply fulfils its function on demand, without being aware of the complex communication path.

The device according to the described aspect may be realized, for instance, as a transponder, or may alternatively be realized in the frame of a USB bus communication.

Referring to the dependent claims, further exemplary embodiments of the invention will be described in the following. These embodiments hold for both the first aspect and the second aspect of the invention.

Particularly, any of the aspects according to the first and second embodiments may be realized in the scope of the device according to the third and fourth embodiments.

Next, exemplary embodiments of the device will be described. These embodiments may also be applied for the method of operating a device.

The device may comprise a read and/or write device interface designed for a communication with at least one read and/or write device according to a first communication protocol. In other words, the device may be adapted in such a manner that data may be read from the device by a read and/or write device, and/or data may be written into the device by the read and/or write device. A particular communication protocol may be used for the communication between the device and read and/or write device.

Particularly the device may be adapted to also use the first communication protocol for transmitting a message between the first application unit and the second application unit by means of (that it to say, via) the transfer unit. According to this embodiment, one and the same communication protocol may be used for the communication between device and read/write device, on the one hand, and for the communication between the two application units of the device via the transfer unit, on the other. This may allow a simplified construction of the device, since only the requirements of a single communication protocol need to be considered.

Particularly the transfer unit of the device may be adapted to receive a message according to a second communication protocol (which may differ from the first communication protocol) from the first application unit and to convert the message into the first communication protocol for sending the converted message to the second application unit. According to this embodiment, a communication between the first and the at least one second application may be enabled, both situated in the first domain of the device. This communication may be mediated by the transfer module, which is situated in the second domain of the device, which is less secure against tampering than the first domain. In this context, a message may be transmitted from the first application unit to the transfer module. Furthermore, the message may be converted in the transfer module according to a communication protocol which is used for communication between the device and the remote terminal. This conversion may change the message format from the first communication protocol to the second communication protocol. Then, the converted message may be transmitted from the transfer module to the second application unit.

Alternatively, the transfer unit of the device may be adapted to receive a message according to the first communication protocol from the first application unit and to convert the message into a second communication protocol (which may differ from the first communication protocol) for sending the converted message to the second application unit. According to this embodiment, a communication between the first and the at least one second application unit is provided, which may be both situated in the first domain of the device. This communication may be mediated by the transfer module which may be situated in the second domain of the device, which is less secure against tampering than the first domain. In the scope of this embodiment, a message may be transmitted according to the first communication protocol which is used for communication between the device and a remote terminal from the first application to the transfer module. Furthermore, this message may be converted in the transfer module to be brought in accordance with a communication protocol, which is used by the second application and which is denoted as the second communication protocol. The converted message may then be transmitted from the transfer module to the second application.

According to another exemplary embodiment of the invention, a security functionality may be provided in the first portion, and the second portion may be free from any security functionality. According to this embodiment, communication within and with the components of the first portion may be protected against unauthorized access, which provides a high degree of security. In contrast to this, the components outside the first portion have no security measures implemented, which allows a simple construction of these components and a simple external access to these components.

The device according to the invention may comprise a processor including the first application unit and the second application unit. Furthermore, the device may comprise a read and/or write device interface designed for a communication between the processor and at least one read and/or write device. Furthermore, the device may comprise at least one user input and/or output unit designed for initiating a communication between a user and the processor via the read and/or write device interface.

The term "processor" may particularly denote a control unit or a smartcard managing unit, like for instance a microprocessor or central processing unit (CPU). Such a processor may be manufactured as a monolithically integrated circuit, for instance produced in semiconductor (particularly in silicon) technology.

The term "read and/or write device" may particularly denote an external (with respect to the device, for instance a smartcard) device for controlling the functionality of the smartcard by reading data from the smartcard and/or by writing data in the smartcard.

The term "user input and/or output unit" may particularly denote a device which may be provided at least partially on this device (for instance a smartcard) and which allows a human user to interact with the device. Particularly such a user input and/or output unit may allow a user to transmit unidirectionally or bidirectionally data to and/or receive data from the processor, which data may be related to a particular application provided by the smartcard.

An "interface" may particularly provide connection or access to a particular component of the communication system.

According to the described embodiment, a device, for instance a smartcard, is provided which provides a user interface (for instance a display and/or a keypad) which is connected to a processor via the same signal path that is also used for a connection of the processor to a read and/or write device for reading information from the smartcard and/or for writing information into the smartcard. The communication between a user, on the one hand (interactively working on the user input and/or output unit as a user interface), and the processor, on the other, may be initiated by the read and/or write device interface. In other words, the communication between the user interface and the processor can be controlled from the side of the user, in contrast to the control of the communication from the side of the processor. Consequently, from the point of view of the processor (which may be located in a secure portion of the smartcard), a communication with a read and/or write (master) terminal may be realized in a similar or identical manner to the communication with the user input and/or output (master) unit. Thus, the processor of the smartcard according to the described embodiment of the invention may act as a slave in both the communication channels with the read and/or write terminal and with the user input and/or output (master) unit. Thus, this communication keeps the secure portion housing the processor unchanged, thereby providing a high level of security.

Furthermore, the first application unit may be capable of providing data to the processor, which data may be related to a corresponding application, and the first application unit may be incapable of providing the data in a format that can be output by the at least one user input and/or output unit. Furthermore, the second application unit may be at least capable of converting the data provided by the first application unit into a format that can be output by the at least one user input and/or output unit. A communication between the first application unit and the second application unit may thus be mediated by the user input and/or output unit, then acting as a data mirror or transfer unit. This embodiment may also allow to extend an already existing application unit that may be located in the security portion, but is unable to provide displayable data. The extension is the second application unit, which may fulfill the function of converting data provided by the first application unit into a displayable format. Also the second application unit may be provided in the secure portion. In addition to the converting function, the second application unit may optionally fulfill one or more further functions, that is to say, is not restricted to the conversion function bringing data in a format that can be displayed.

The transfer unit may be adapted to take the role of communication master concerning a transmission of a message between the first application unit and the second application unit. The transfer unit may therefore initiate a communication between the application units and may, for this purpose, establish a corresponding communication network. On this level, both application units act as slaves.

The first application unit may be adapted to take the role of a master concerning the content of a message transmitted to the second application unit. In other words, when the first application unit communicates with the second application unit, then the first application unit may control the content of this communication with the slave-like second application unit, and may particularly specify the subject matter or data content related to the message according to such a communication. On this level, the second application unit acts as a slave.

A communication between the first application unit and the second application unit may be mediated by the at least one user input and/or output unit as the transfer unit. Therefore, the user input and/or output unit may function as a data mirror simply forwarding data from the first application unit to the second application unit, or vice versa.

The device may be adapted in such a manner that a message transmitted between the first application unit and the second application unit is encrypted. By taking this measure, a secure communication system is obtained, since even when a message is mediated via a non-secure area, the encryption ensures that a high security standard is maintained. Any decryption keys required for decrypting may be located within the secure portion.

In the device, the transfer unit may be incapable of decrypting the message. Consequently, a high level of security may be achieved, since the mediating instance may lack any capability to decode mediated messages.

A communication between the first application unit and the second application unit may include the transmission of at least one Application Protocol Data Unit (APDU). An Application Protocol Data Unit may be defined as a communication unit according to the ISO 7816 standard. There are command APDUs which transmit commands between two entities, and response APDUs, which transmit a response to a command. The APDU communication scheme relates to the well-known OSI model ("Open Systems Interconnection"). Specifically for smartcards, the concept of APDUs is described in ISO 7816-4 to which explicit reference is made herewith.

The first application unit of the device may be a legacy application unit, that is to say, an application just providing the application without providing sophisticated additional (for instance display) functionality.

The device may be designed for transmitting a message between the first application unit and the second application unit according to ISO 7816. Particular references made in this respect to the parts of the ISO 7816 which relate to the definition and use of Application Protocol Data Units (APDUs). The ISO 7816 series or standard defines not only physical shapes of the smartcard and the positions and shapes of its electrical connectors, but also communication protocols and power voltages to be applied to these connectors, a functionality and a format of commands sent to the smartcard and the response returned by the smartcard. The communication between the application units via the transfer unit may be carried out, according to this embodiment, according to the same industrial standard as the communication between the read and/or write device, on the one hand, and the processor, on the other.

The device according to the invention may be realized as a smartcard or a nearfield communication device.

Exemplary applications of the device realized as a smartcard according to the invention include the use as a credit card, as a SIM card for a mobile phone, as an authorization card for pay television, as an identification and access control card, as a public transportation ticket, etc.

The smartcard according to the invention may be realized as a contact-type smartcard or as a contactless smartcard. In a contact-type smartcard, an integrated circuit or semiconductor chip including the processor can be recognized by electrically conductive contacts. In a non-contact-type smartcard which may also be denoted as a contactless smartcard, the chip may communicate with the card reader/writer through wireless self-powered induction technology (particularly by exchanging electromagnetic waves, for instance in the high-frequency domain, between the card reader/writer in the smartcard). The technology of contactless smartcards according to the invention can be realized or combined with the technology of RFID (Radio Frequency Identification).

Alternatively, the device may be realized as nearfield communication (NFC) device. Nearfield communication may enable a user to exchange all kinds of information, in security, simply by bringing two devices close together. Its short-range interaction of, for instance, a few centimeters may greatly simplify the whole issue of identification, as there is less confusion when devices can only "hear" their immediate neighbours. NFC may allow to connect devices such as digital cameras, PDAs, set top boxes, computers and mobile phones. The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

DESCRIPTION OF EMBODIMENTS

Figure 1:
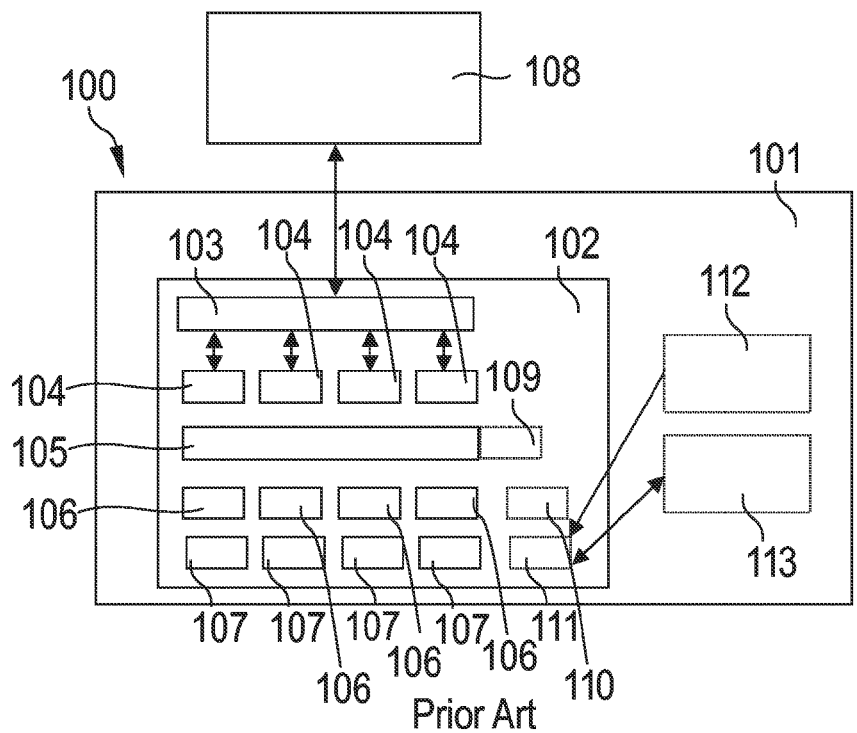
FIG. 1 shows a smartcard according to the prior art.

The illustration in the drawing is schematical. In different drawings, similar or identical elements are provided with the same reference signs.

In the following description of the figures, the term "smart display controller" is used as an example for the "transfer unit". Similarly, the terms "display application unit" and "legacy application unit" are used as examples for the "first application unit" and the "second application unit". The term "processor" may denote a secure "first portion" and the term "user input and output unit" may denote a less secure "second portion" of the "smartcard" which is an example for the more general term "device". However, the invention is not limited to these examples.

In the following, referring to FIG. 2, a smartcard 200 according to an exemplary embodiment of the invention will be described in detail. As far as similar components are concerned in FIG. 2, it is supplementary referred to the above description of FIG. 1.

The various components of the smartcard 200 are provided on and/or in a plastic substrate 201. The size of the smartcard 200 may be that of a conventional credit card. The smartcard 200 shown in FIG. 2 is capable of providing a plurality of applications (each of which being related to a particular one of application units 204). The smartcard 200 comprises a microprocessor 202 which is designed to carry out calculations and control functions in the scope of servicing the different applications.

A smartcard read and write terminal 208 (also denoted as a card reader/writer) is provided for reading information stored or generated in the smartcard 200 or for programming or introducing externally input data in the smartcard 200. A read and write device interface 213 of the smartcard 200 is designed for a bidirectional communication between the smartcard read and write device 208 and the microprocessor 202.

Further, a user input and output unit 212 (I/O unit) is provided in the smartcard. The user input and output unit 212 can actively initiate a communication between a human user (not shown) and the microprocessor 202 via the smartcard read and write device interface 213. Thus, in the scope of a communication between the user input and output unit 212, on the one hand, and the microprocessor 202, on the other, the user input and output unit 212 plays the role of master, and the microprocessor 202 plays the role of slave. This assignment is atypical, since in the field of electronics it is usually a microcontroller that plays the role of master. However, this assignment has the crucial advantage that it improves the security of the data transfer between the different components of the smartcard 200.

The user input and output unit 212 comprises a smart display controller 211 which is realized, according to the described embodiment, in hardware, and which coordinates the communication between the processor 202, on the one hand, and display hardware 210 and buttons 209 (as further components of the user input and output unit 212), on the other.

A user may use the buttons 209 to type in commands to be provided, via the smart display controller 211 and the interface 213, to the processor 203 for further processing these data in the context of one of the applications assigned to the application units 204. For instance, an application can be a credit/debit financial card application, or the like. Furthermore, data related to an application performed by the smartcard 200 can be transmitted from the processor 202 via the interface 213 and the smart display controller 211 to a display hardware 210 which displays corresponding information to be visible and/or audible for a human user.

Figure 2:
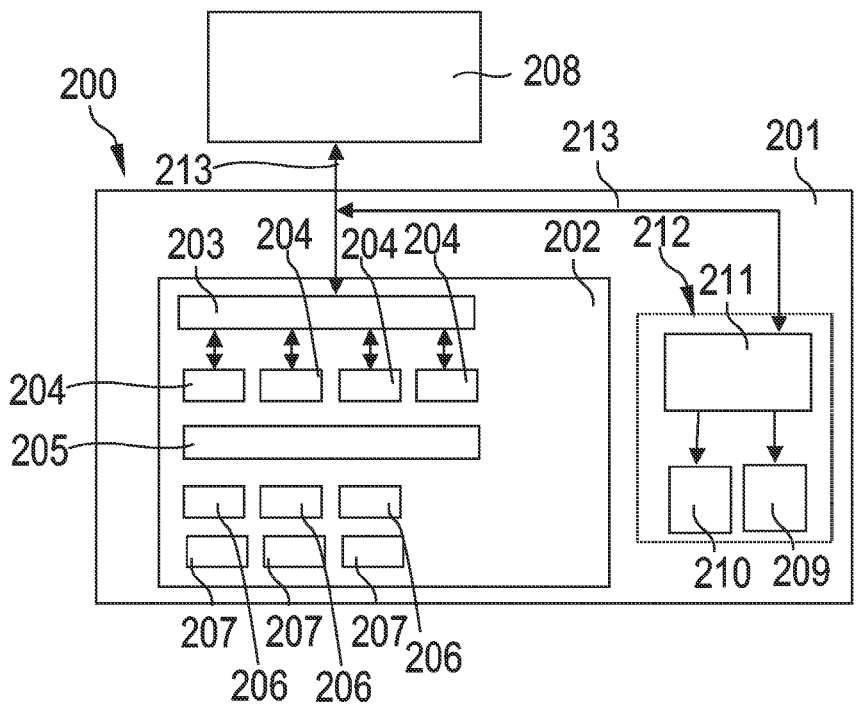
FIG. 2 shows a smartcard according to an exemplary embodiment of the invention.

As can be seen from FIG. 2, the smartcard 200 is divided into a security portion or processor 202 and into a—remaining—non-security portion. The microprocessor 202 including the plurality of application units 204 is residing in the security portion. Furthermore, an operating system 205 is provided which may comprise software components for operating the smartcard 200. Moreover, a plurality of driver units 206 and a plurality of hardware units 207 are provided. Each of the hardware units 207 may include components such as a sub-processor, a memory, a peripheral, or an encryption/decryption sub-processor.

The communication protocol used for a communication between the smartcard read and write terminal 208 and the microprocessor 202 equals a communication protocol for a communication between a user (not shown) operating the user input and output unit 212 and the microprocessor 202. Both these communication channels are realized by an exchange of Application Protocol Data Units (APDUs) and according to the industry standard ISO 7816.

The user input and output unit 212 includes the display 210 (which can be realized based on the Philips Flexible Display Systems technology) and buttons 209. According to the embodiment shown in FIG. 2, the user input and output unit 212 is realized as a hardware unit.

The smartcard 200 is a quick, secure and low-cost device in which the high security world of smartcard device and corresponding software remains essentially unchanged (thus secured and invulnerable to potential attacks), but has included a possibility of card application to realize user interaction through existing secure infrastructure. Although the embodiment shown in FIG. 2 focuses on a display 210 and on buttons 209 connected to the smartcard 200 hardware, the system according to the invention can also connect other in-card electronics, such as for instance fingerprint readers or the like.

In the following, the hardware/software connection of the display functionality through existing physical and logical interfaces will be described. FIG. 2 shows an extension of a smartcard system with display functionality. In the smartcard 200, the smartcard processor system (hardware and software) essentially remain unchanged and thus remain secure. In FIG. 2, the I/O functionality is added as a separate block 212 next to the processor or secure domain 202 of the smartcard 200.

The smart display controller 211 communicates with smartcard applications (more detailed communicates with the microprocessor 202) using an ISO 7816 interface 213 and by exchanging APDUs with the microprocessor 202. The communication between the user input and output unit 212 with the microprocessor 202 is realized in the same way as the communication with the smartcard read and write terminal 208. Through the interface 213, the smart display controller 211 may inform an application unit 204 by a corresponding message that a button 209 has been pressed by a user and asks the respective application 204 for data that should be displayed on the display 210. The security of the system is not affected by the addition of the user input and output unit 212, since the only change resides in applications, which need to understand protocol to drive data on the display 210. No modifications on other system components are required.

The smart display controller 211 can be realized in both hardware and software, wherein both realizations are the same as regards concept.

The smartcard 200 shows a realization of the smart display controller 211 in hardware. This requires the implementation of the functional block in the display driver and requires connections to ISO 7816 contacts to that driver. The embodiment of FIG. 2 is very flexible, since the display functionality is only dependent on an application developer. In such a scenario, no additional hardware interface on the microprocessor 202 is needed.

In the following, referring to FIG. 3, a smartcard 300 according to another exemplary embodiment of the invention will be described.

Figure 3:
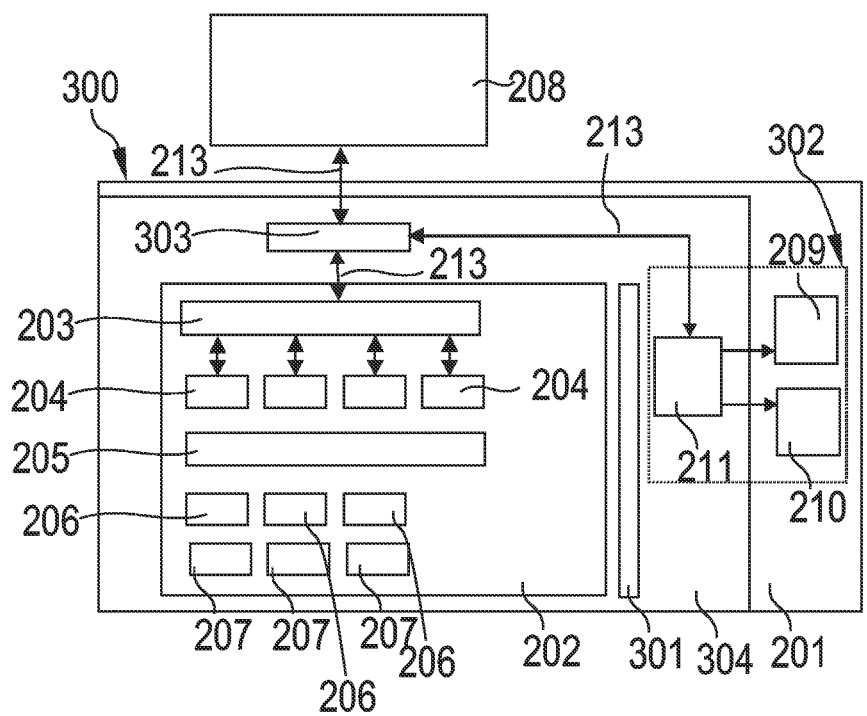
FIG. 3 shows a smartcard according to another exemplary embodiment of the invention.

In the embodiment shown in FIG. 3, the smart display controller 211 is realized in software. Thus, the smart display controller 211 of the user input and output unit 302 resides in a software block 304 of the smartcard 300. The smart display controller 211 further contains the buttons 209 and the display hardware 210. A receiver/transmitter buffer 303 (RX/TX buffer) and a firewall unit 301 also reside in the software block 304.

Realizing the smart display controller 211 in software means that there is a functionality to send and receive APDUs to the card manager 203 of the microprocessor 202 in software by means of a function call, for instance through the receiver/transmitter buffer 303. The smart display controller 211 is operated based on software commands as well. It runs in a firewalled region of the card controller, completely separated from the secure domain 202 (similar to a Philips Mifare emulation on Philips smartcard processors). It drives the display hardware 210 and the buttons 209 through a dedicated interface, for instance through a serial interface. This embodiment of FIG. 3 needs no or only little certification.

In the following, referring to FIG. 4, a portion 400 of a smartcard according to an exemplary embodiment of the invention will be described having implemented a data mirror functionality of the smart display controller.

Figure 4:
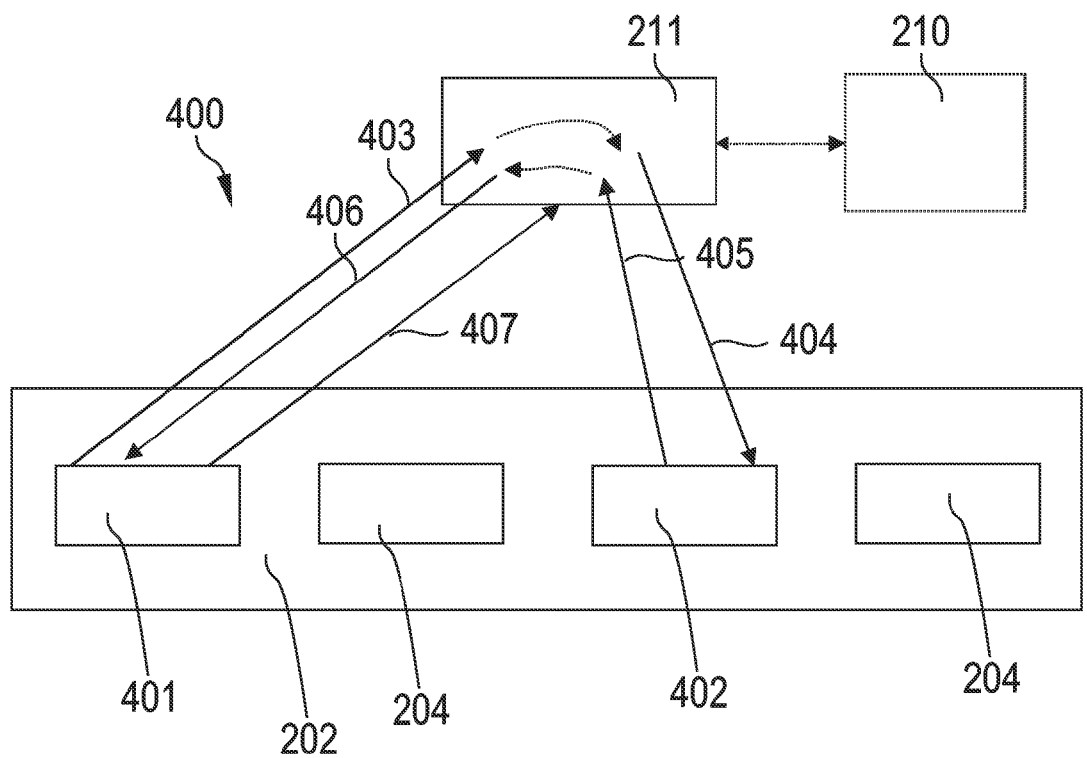
FIG. 4 shows a part of a smartcard according to an exemplary embodiment of the invention illustrating a mirror functionality of a user input and/or output unit.

FIG. 4 illustrates a concept for adding display functionality to legacy applications. The system of FIG. 4 can be integrated in the device 200 shown in FIG. 2 or in the device 300 shown in FIG. 3. Particularly, all aspects mentioned referring to FIG. 1 to FIG. 3 may also hold for FIG. 4. More particularly, components 401 and 402 as shown in FIG. 4 may be connected in FIG. 2 or FIG. 3, at the location of any of components 204.

As seen in FIG. 4, the portion 400 comprises a display application unit 401 residing in the security portion or processor 202 and a legacy application unit 402 also residing in the security portion or processor 202. Apart from the display application 401 and the legacy application unit 402, further application units 204 are provided in the security portion 202. As will be described in the following, a communication between the display application unit 401 and the legacy application unit 402 may be performed via a plurality of transmission channels 403 to 407 and may be mediated by the smart display controller 211 acting as a data mirror or transfer unit.

The embodiment shown in FIG. 4 solves the problem of displaying information from well-established and standardized legacy applications (like the one included in the legacy application unit 402), for instance electronic purse (CEPS, Geldkarte, Chipknip). In many cases, such already existing applications are not designed to display information such as an amount stored in the e-purse on a display.

A straightforward solution to this problem would be to add a display function to the application units. However, that approach would require a major development effort followed by certifications and a long period of achieving industrial acceptance.

Another possible solution could be an implementation of terminal emulation functionality in the smart display controller 211. Such an emulated terminal would be able to read required data (for instance an e-purse amount) from the legacy application, format it and display it on the display. However, such a solution would have several disadvantages. For instance, the smart display controller 211 would have to implement the whole terminal functionality with protocols for different application standards (e.g. Geldkarte for Germany, Chipknip for the Netherlands, or CEPS for the new cards). That would result in a complicate and expensive block of hardware and/or software.

Further, the communication with the legacy application unit 402 is often encrypted. This implementation would thus require encryption keys to be stored in the smart display controller 211 during a card completion process (which is cost intensive and complex). It would also require implementation of cryptology algorithms in the smart display controller 211. Moreover, there would be no customization possibility for the information displayed on the smartcard, since the smart display controller 211 would have to format the display content.

The solution according to FIG. 4 is an implementation of mirror functionality for APDU packages in the smart display controller 211 with a separate display application unit 401. This display application unit 401 is able to retrieve information necessary to format a display content using a standard, known legacy application protocol. Any communication message transmitted between the display application unit 401 and the display application conversion unit 402 is mirrored through the smart display controller 211 as illustrated in FIG. 4. In FIG. 4, only some relevant components of a smartcard are shown as a portion 400. Communication arrows 403 to 407 symbolize the master-slave principle of data exchange of ISO 7816 protocols to simplify the picture.

The application components are encapsulated in the secure domain 202 of a smartcard IC. In the implementation of FIG. 4, there is a display application unit 401 which is a special application designed to retrieve, interpret and display data of one or more given legacy application units 402 through the smart display controller 211.

The communication works as follows: The smart display controller 211 may initiate a communication with the display application unit 401 and/or with the legacy application unit 402 and may act as a master in this communication scheme, whereas components 401, 402 act as slaves. The display application unit 401 sends a request to the smart display controller 211 to mirror (that is to say, to forward) communication messages to the target legacy application unit 402. Together with the request, the display application unit 401 sends an encapsulated APDU which is to be forwarded to the legacy application unit 402, see first transmission arrow 403. In other words, concerning the content of the message to be transmitted, the display application unit 401 takes the role of a master, whereas the legacy application unit 402 takes the role of a slave.

Subsequently, the smart display controller 211 sends (that is to say, mirrors) the requested APDU to the legacy application unit 401, see second transmission arrow 404.

The legacy application unit 402 responds in a usual way Oust like in a communication with a terminal) with data/status to the smart display controller 211, see third transmission arrow 405.

The smart display controller 211 again mirrors the response back to the display application unit 401, see fourth transmission arrow 406.

Then, the display application unit 401 can provide display content to the smart display controller 211, see fifth transmission arrow 407, based on data received from the legacy application unit 402.

A significant advantage of this method is improved security. Since the smart display controller 211 does not need to interpret the mirrored data, the data can be scrambled with cryptography keys without leaving the secure domain 202. This means that the display application unit 401 can, in a secure way, get information from the legacy application unit 402 (and vice versa) and extract information that could be displayed on the screen and then send it to the smart display controller 211.

Another benefit of this solution is that a service provider is able to customize the display application unit 401 (that is for instance to change the way data are displayed) and stays independent of card or operating system used. It may even add user identification through, for instance, PIN code to the display application unit 401 to secure access to personal data in the legacy application unit 402. The mirror functionality can be easily implemented in the smart display controller 211.

The system according to the invention may be used in multi-component smartcards, especially in smartcards with a display. The invention allows a quick integration of display functionality into existing smartcard systems without affecting the total system security, and it provides a solution to backward compatibility. The system according to the invention provides, through the use of existing standards like ISO 7816, a high degree of simplicity in use for potential customers.

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

The invention claimed is:

1. A device comprising:
a first application unit and a second application unit both provided in a first portion of the device, said first application unit providing a functionality associated with a data content and said second application unit operating on said data content;
a transfer unit provided in a second portion of the device; and
a read and/or write device interface having a common communication connection with at least one read and/or write device, said transfer unit and at least one of said first application unit and said second application unit, wherein communication with said at least one read and/or write device through said read and/or write device interface is performed according to a first communication protocol;
wherein a higher level of security is provided in the first portion than in the second portion, said higher level of security being associated with measures for handling of data in said first portion that are lacking in the second portion;
wherein the transfer unit is configured to:
receive a message according to a second communication protocol from the first application unit;
convert the message in accordance with the first communication protocol for sending the converted message to the second application unit;
transmit an encrypted message between the first application unit and the second application unit; and
operate as a data mirror of data in the first application unit and the second application unit operates on the mirrored data, said transfer unit lacking means to decrypt said encrypted message.

2. The device according to claim 1, wherein a message between the first application unit and the second application unit is transmitted by means of the transfer unit using the first communication protocol.

3. The device according to claim 1, comprising
a processor including the first application unit and the second application unit; and
at least one user input and/or output unit designed for initiating a communication between a user and the processor via the read and/or write device interface.

4. The device according to claim 3,
wherein the first application unit is capable of applying data to the processor, which data are related to a corresponding application, and wherein the first application unit is incapable of providing the data in a format that can be output by the at least one user input and/or output unit; and
the second application unit is at least capable of converting the data provided by the first application unit into a format that can be output by the at least one user input and/or output unit.

5. The device according to claim 1, wherein the transfer unit is a communication master concerning transmission of a message between the first application unit and the second application unit.

6. The device according to claim 5, wherein the first application unit is a content master concerning content of the message transmitted to the second application unit.

7. The device according to claim 2, wherein the message transmitted between the first application unit and the second application unit by means of the transfer unit is transmitted according to ISO 7816.

8. A device comprising:
a first application unit and a second application unit both provided in a first portion of the device;
a read and/or write device interface having a common communication connection with at least one read and/or write device, a transfer unit and at least one of said first application unit and said second application unit, wherein communication with said at least one read and/or write device through said read and/or write device interface is performed according to a first communication protocol;
the transfer unit provided in a second portion of the device;
wherein the transfer unit is configured to:
receive a message according to a second communication protocol from the first application unit;
convert the message in accordance with the first communication protocol for sending the converted message to the second application unit;
receive an encrypted message from one of said first and said second application units;
transmit the encrypted message to the other of the first application unit and the second application unit; and
operate as a data mirror of data in the first application unit and the second application unit operates on the mirrored data, said transfer unit lacking means to decrypt said encrypted message.

9. The device according to claim 8, wherein the first application unit is adapted to:
operate as a content master concerning the content of a message transmitted to the second application unit.

10. A device comprising:
a first application unit and a second application unit both provided in a first portion of the device, said first application unit providing a functionality associated with a data content and said second application unit operating on said data content;
a transfer unit provided in a second portion of the device; and
a read and/or write device interface having a common communication connection with at least one read and/or write device, said transfer unit and at least one of said first application unit and said second application unit, wherein communication with said at least one read and/or write device through said read and/or write device interface is performed according to a first communication protocol;
wherein a higher level of security is provided in the first portion than in the second portion, said higher level of security being associated with measures for handling of data in said first portion that are lacking in the second portion;
wherein the transfer unit is configured to:
receive a message according to the first communication protocol from the first application unit;
convert the message in accordance with a second communication protocol for sending the converted message to the second application unit;
transmit an encrypted message between the first application unit and the second application unit, and
operate as a data mirror of data in the first application unit and the second application unit operates on the mirrored data, said transfer unit lacking means to decrypt said encrypted message.

11. A device comprising:
a first application unit and a second application unit provided in a first portion of the device;
a read and/or write device interface having a common communication connection with at least one read and/or write device, a transfer unit and at least one of said first application unit and said second application unit, wherein
communication with said at least one read and/or write device through said read and/or write device interface is performed according to a first communication protocol;
the transfer unit provided in a second portion of the device;
wherein the transfer unit is configured to:
receive a message according to the first communication protocol from the first application unit;
convert the message in accordance with a second communication protocol for sending the converted message to the second application unit;
receive an encrypted message from one of said first and said second application units;
transmit the encrypted message to the other of the first application unit and the second application unit; and
operate as a data mirror of data in the first application unit and the second application unit operates on the mirrored data, said transfer unit lacking means to decrypt said encrypted message.

12. A device comprising:
a first application unit and a second application unit provided in a first portion of the device;
a transfer unit provided in a second portion of the device, said transfer unit configured to:
receive a message according to a first communication protocol from the first application unit;
convert the message in accordance with a second communication protocol; and
send the converted message to the second application unit, wherein the first application incorporates a higher level of security to said messages than available to said transfer unit.

13. The device of claim 12, further comprising:
a read/write device in communication with said transfer unit, said transfer unit communicating with said read/write device using said second communication protocol.

* * * * *